United States Patent [19]
Chung

[11] Patent Number: 5,579,556
[45] Date of Patent: Dec. 3, 1996

[54] HANDLE OF A STROLLER

[76] Inventor: Fu S. Chung, No. 10, Alley 1, Lane 42, Tai Tze Road, Jen Te Hsiang, Tainan, Taiwan

[21] Appl. No.: 572,371

[22] Filed: Dec. 14, 1995

[51] Int. Cl.$^6$ .............................. A47B 95/02; B25G 1/04
[52] U.S. Cl. ........................ 16/114 R; 16/110 R; 16/115; 280/47.371
[58] Field of Search .................................. 16/114 R, 113, 16/115, 110 R, DIG. 12, DIG. 24, DIG. 25; 280/47.371, 642; D8/315, 316, 317, 318, 319, 320; 30/125, 340

[56] References Cited

U.S. PATENT DOCUMENTS

| | | | |
|---|---|---|---|
| 2,987,149 | 6/1961 | Finkelstein | D8/317 |
| 5,008,970 | 4/1991 | Tsai | 16/110 R |

Primary Examiner—Chuck Y. Mah
Attorney, Agent, or Firm—Pro-Techtor International

[57] ABSTRACT

A handle which includes a transverse handle section, and two tubular coupling sections at two opposite ends of the transverse handle section for coupling to the frame of a stroller, wherein the transverse handle section has two opposite open sides detachable covered with ornamental blocks, each of the ornamental block having a plurality of pins at the back side for fastening to the open sides of the transverse handle section and an outside wall decorated with patterns, each open side of the transverse handle section being divided by two partition walls into two handgrip zones and an intermediate zone between the handgrip zones, each of the intermediate zone and the handgrip zones having a plurality of intersected ribs and a plurality of cylindrical sockets at the crossed portions of the intersected ribs for snugly receiving the pins of the ornamental blocks.

3 Claims, 3 Drawing Sheets

HANDLE OF A STROLLER

BACKGROUND OF THE INVENTION

The present invention relates to a handle for strollers, and relates more particularly to such a handle which is mounted with ornamental blocks at both sides.

The handles of regular strollers are commonly made in a solid structure having a substantially U-shaped profile. The periphery of a stroller handle may be made corrugated adapted for the holding of the hand comfortably and positively. However, this structure of stroller handle is monotonous and less attractive.

SUMMARY OF THE INVENTION

The present invention has been accomplished to provide a stroller handle which is attractive. According to one aspect of the present invention, the handle comprises a transverse handle section, and two tubular coupling sections at two opposite ends of the transverse handle section for coupling to the frame of a stroller, wherein the transverse handle section has two opposite open sides detachably covered with ornamental blocks. Each of the open sides has intersected ribs and sockets at the crossed portions of the intersected ribs for mounting the ornamental blocks. Each of the ornamental blocks has a plurality of pins at the back side respectively fitted into the sockets of the transverse handle section, and an outside wall decorated with patterns. According to another aspect of the present invention, each of the sockets has an inside annular groove; each of the pins of the ornamental blocks has an outside annular flange around the periphery forced into engagement with the inside annular groove of the respective cylindrical socket.

DETAILED DESCRIPTION OF THE PREFERRED EMBODIMENT

Figure 1:
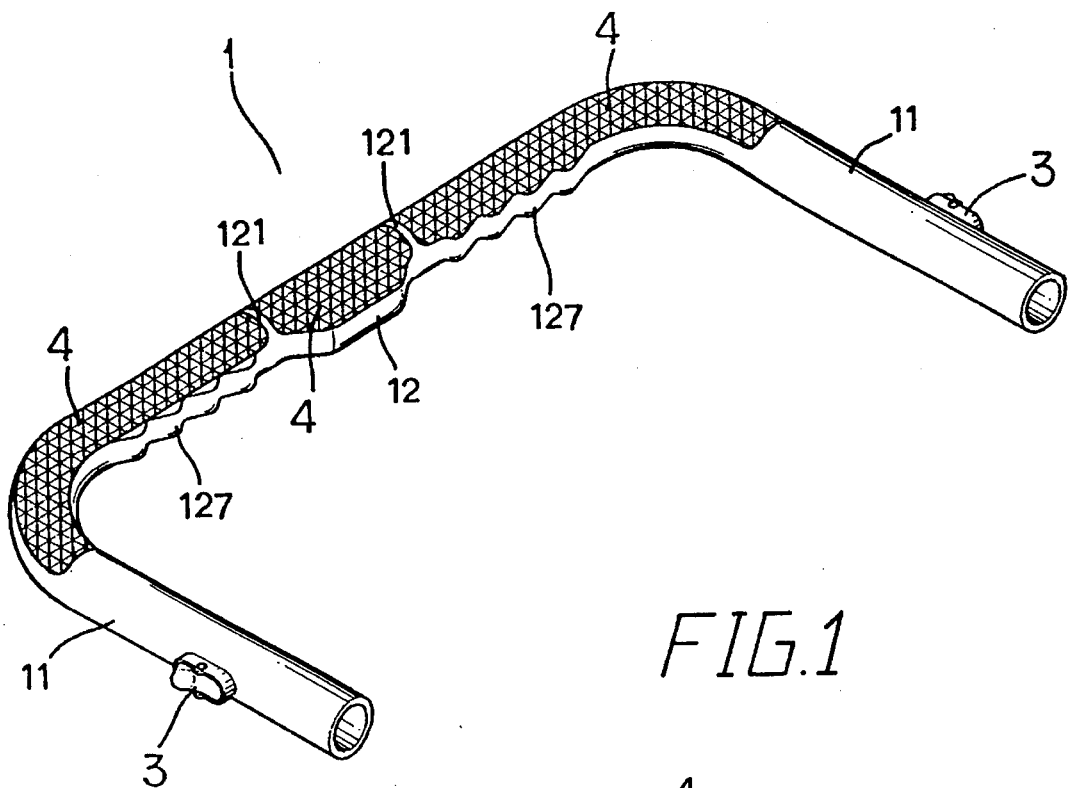
FIG. 1 is an elevational view of a handle according to the present invention.
Figure 2:
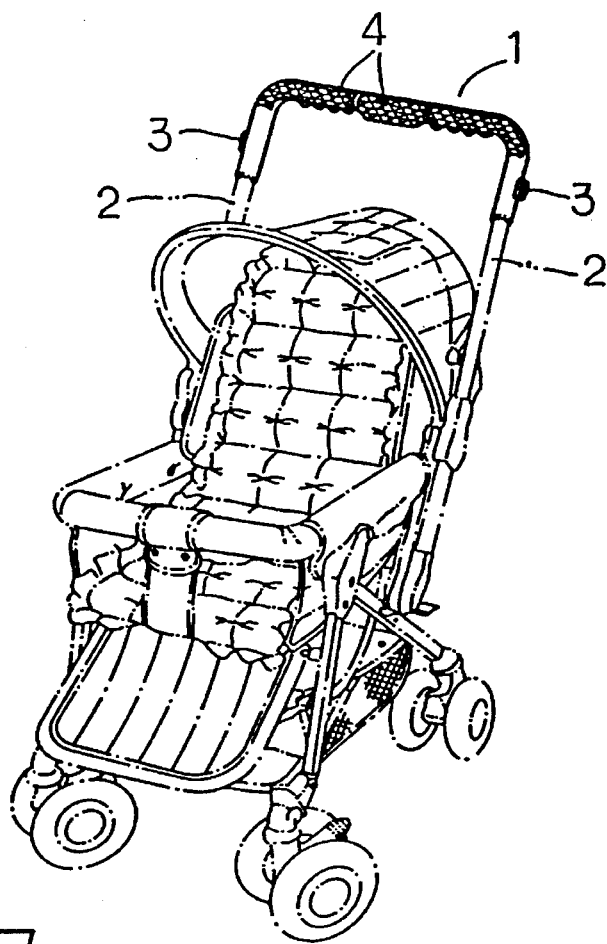
FIG. 2 shows the handle installed in a stroller according to the present invention.
Figure 3:
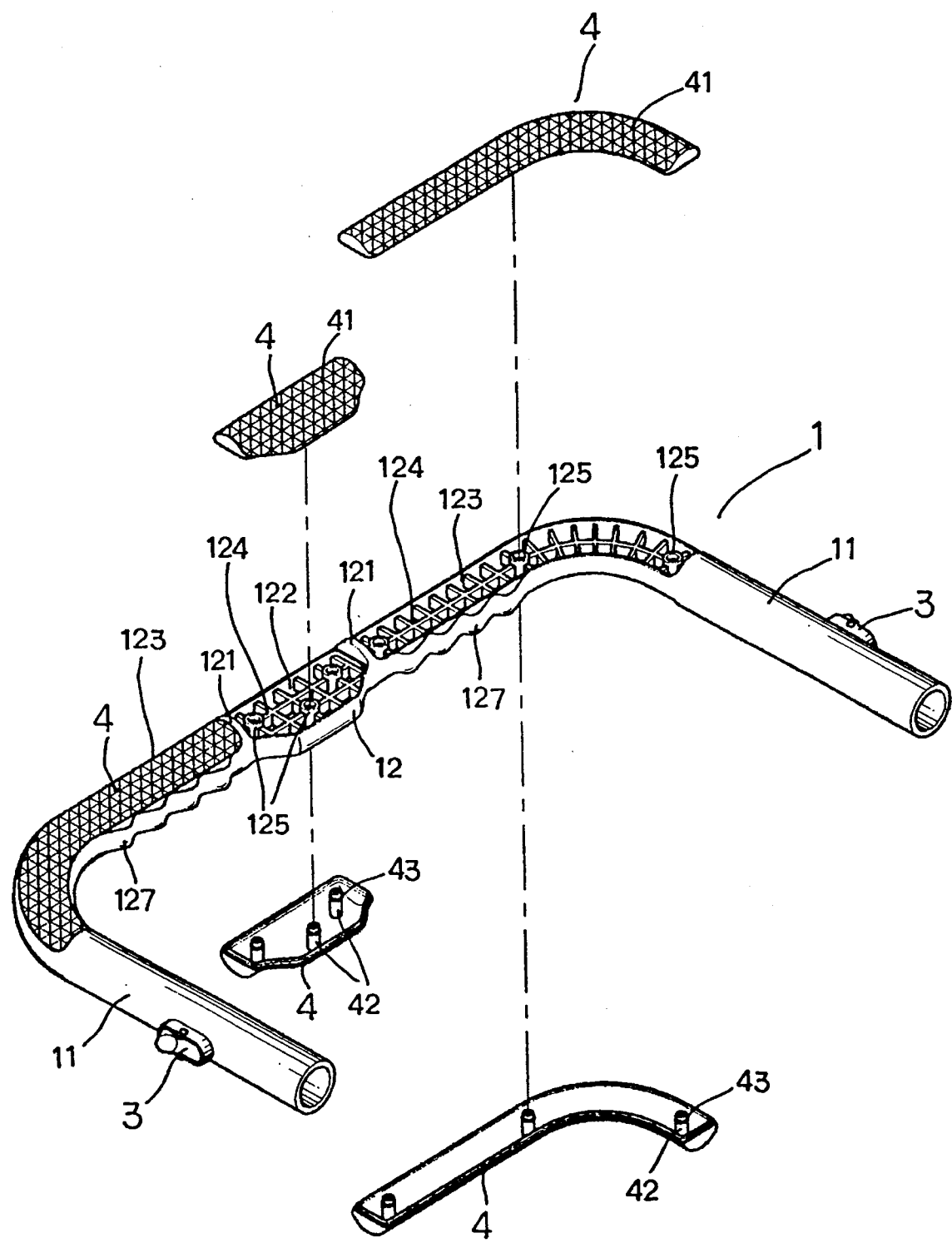
FIG. 3 is an exploded view of the handle shown in FIG. 1.
Figure 4:
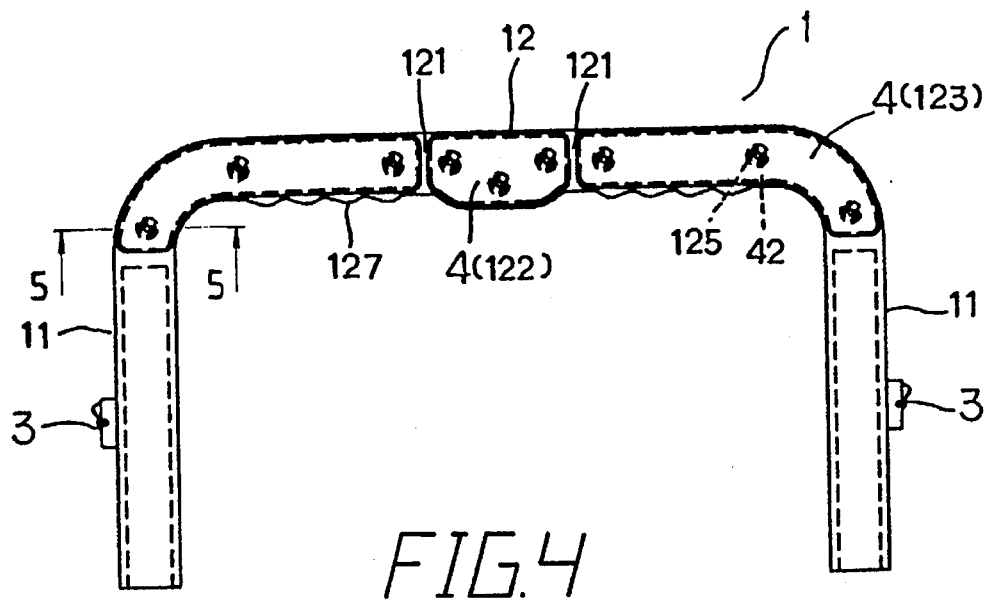
FIG. 4 is a top plain view of the handle shown in FIG. 1.

Referring to FIGS. 1, 2, 3, 4, and 5A, the handle, referenced by 1, comprises a transverse handle section 12, and two tubular coupling sections 11 respectively extending from two opposite ends of the transverse handle section 12 at right angles and disposed in a parallel relation. Each of the tubular coupling sections 11 has a lock 3 for locking the handle 1 in position when the tubular coupling sections 11 are respectively sleeved onto the two opposite side bars 2 of a stroller (see FIG. 2). The connecting area between the transverse handle section 12 and each tubular coupling section 11 is a solid structure which stops the respective side bar 2 from passing. The transverse handle section 12 has two opposite sides respectively made in a hollow structure. Two transverse partition walls 121 are made at each side of the transverse handle section 12, defining two handgrip zones 123 at two opposite sides relative to the transverse partition walls 121 and an intermediate zone 122 between the handgrip zones 123 within the transverse partition walls 121. Intersected ribs 124 are respectively made within each of the handgrip zones 123 and the intermediate zone 122. A plurality of cylindrical sockets 125 are respectively made at the crossed portions of the intersected ribs 124, each cylindrical socket 125 having an inside annular groove 126 (see FIG. 5A). Each of the handgrip zones 123 has a corrugated peripheral wall 127 adapted for the holding of the hand positively and comfortably. Three ornamental blocks 4 are respectively fastened to the intermediate zone 122 and the handgrip zones 123 at each side of the transverse handle section 12. The ornamental blocks 4 are made of different sizes respectively fitting the intermediate zone 122 and the handgrip zones 123. Each of the ornamental blocks 4 has a patterned outside wall 41, and a plurality of upright pins 42 at an inner side respectively fitted into the cylindrical sockets 125 in the respective zone. Each of the upright pins 42 has an outside annular flange 43 around the periphery, which is forced into engagement with the inside annular groove 126 of the respective cylindrical socket 125 when installed.

Figures 5A, 5B:
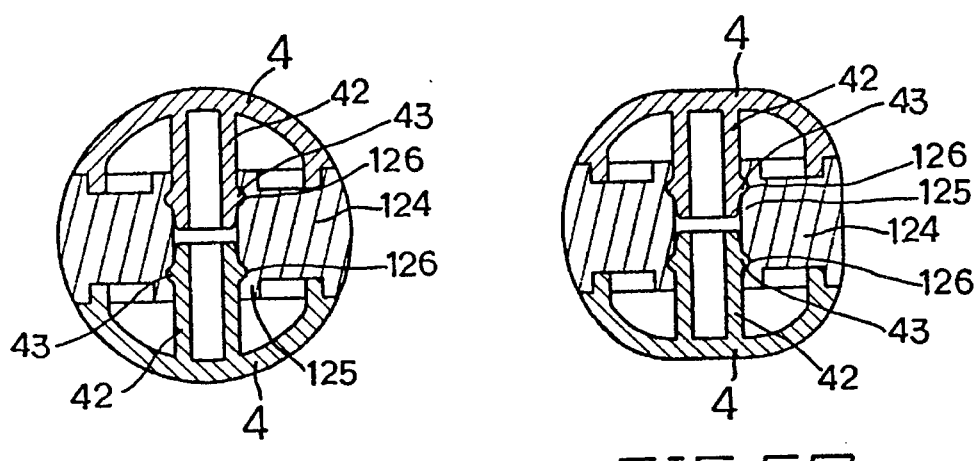
FIG. 5A is a sectional view in an enlarged scale taken along line 5—5 of FIG. 4.
FIG. 5B is similar to FIG. 5A but showing a different shape of the ornamental block.
Figure 6:
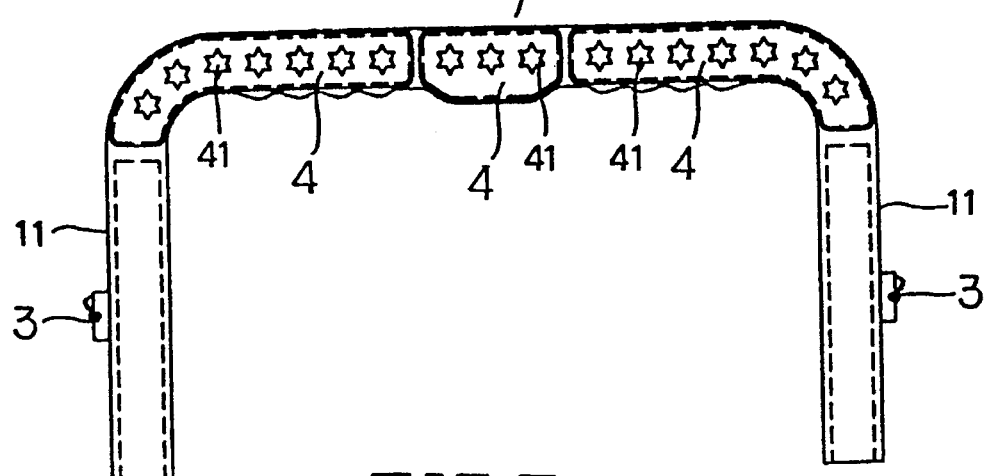
FIG. 6 is a top plain view of an alternate form of the handle according to the present invention.

The ornamental blocks 4 may be variously shaped. FIG. 5B shows a different cross section of the ornamental blocks 4. The patterned outside wall 41 of the ornamental blocks 4 can also be decorated with any of a variety of patterns. For example, the patterned outside wall 41 of the ornamental blocks 4 shown in FIG. 6 presents a star-like pattern.

It is to be understood that the drawings are designed for purposes of illustration only, and are not intended as a definition of the limits and scope of invention disclosed.

I claim:

1. A handle comprising a transverse handle section, and two tubular coupling sections at two opposite ends of said transverse handle section for coupling to the frame of a stroller, wherein said transverse handle section comprises two opposite open sides, and a plurality of ornamental blocks respectively covered on said open sides, each of said ornamental blocks comprising a plurality of pins at one side for fastening to the open sides of said transverse handle section, and an outside wall decorated with patterns, each of the open sides of said transverse handle section being divided by two partition walls into two handgrip zones and an intermediate zone between said handgrip zones, each of said intermediate zone and said handgrip zones comprising a plurality of intersected ribs and a plurality of cylindrical sockets at the crossed portions of said intersected ribs for snugly receiving the pins of said ornamental blocks.

2. The handle of claim 1 wherein the connecting area between said transverse handle section and each tubular coupling section is a solid structure.

3. The handle of claim 1 wherein each of said cylindrical sockets has an inside annular groove; each of the pins of said ornamental blocks has an outside annular flange around the periphery forced into engagement with the inside annular groove of the respective cylindrical socket.

\* \* \* \* \*